(12) United States Patent
Sperrle

(10) Patent No.: US 12,546,409 B2
(45) Date of Patent: Feb. 10, 2026

(54) VALVE UNIT AND METHOD FOR PRODUCING THE VALVE UNIT

(71) Applicant: Buerkert Werke GmbH & Co. KG, Ingelfingen (DE)

(72) Inventor: Till Sperrle, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 0 days.

(21) Appl. No.: 18/667,142

(22) Filed: May 17, 2024

(65) Prior Publication Data

US 2025/0354621 A1   Nov. 20, 2025

(51) Int. Cl.
*F16K 27/12* (2006.01)
*F16K 27/04* (2006.01)
*F16K 31/04* (2006.01)

(52) U.S. Cl.
CPC ............ *F16K 27/12* (2013.01); *F16K 27/048* (2013.01); *F16K 31/04* (2013.01); *F16K 31/041* (2013.01); *F16K 2200/30* (2021.08)

(58) Field of Classification Search
CPC ...... F16K 27/048; F16K 27/12; F16K 31/041; F16K 31/043; Y10T 137/6851; Y10T 137/7043

See application file for complete search history.

(56) References Cited

U.S. PATENT DOCUMENTS

| | | | |
|---|---|---|---|
| 3,326,511 A | 6/1967 | Hallgreen | |
| 5,520,546 A * | 5/1996 | Klinger | F15B 13/0853 303/119.3 |
| 6,119,725 A | 9/2000 | Shinobu et al. | |
| 6,662,825 B2 * | 12/2003 | Frank | B60T 8/362 137/557 |
| 6,955,335 B2 * | 10/2005 | Kawai | F16K 31/043 74/606 R |
| 7,428,892 B2 * | 9/2008 | Isogai | F16K 31/043 251/305 |
| 8,844,569 B2 * | 9/2014 | Lin | F16K 31/041 137/625.45 |
| 9,909,669 B2 | 3/2018 | Beck et al. | |
| 10,024,438 B2 * | 7/2018 | Misumi | F16K 1/2028 |
| 10,450,969 B2 * | 10/2019 | Stark | F16K 1/22 |

(Continued)

FOREIGN PATENT DOCUMENTS

| | | |
|---|---|---|
| DE | 19928748 A1 | 9/2000 |
| DE | 102012201484 B3 | 6/2013 |

(Continued)

*Primary Examiner* — Kevin F Murphy
(74) *Attorney, Agent, or Firm* — Dilworth IP, LLC

(57) ABSTRACT

A valve unit is provided which has a housing with a cover. Accommodated in the housing is a valve drive which is connected to a valve spindle. A closing body is arranged at an end of the valve drive opposite to the valve spindle. Furthermore, an elastic element is arranged between a contact face in the housing facing away from the closing body and the valve drive, so that the elastic element pretensions the valve drive toward the cover in a closed state of the valve unit. Such a configuration of the valve unit allows the accommodation of a valve unit in a housing to be simplified. Furthermore, the tolerances, for example the manufacturing tolerances of the housing, are compensated for by the pretensioning of the valve drive by the elastic element.

11 Claims, 3 Drawing Sheets

(56) References Cited

U.S. PATENT DOCUMENTS

| | | |
|---|---|---|
| 10,557,563 B2 | 2/2020 | Thurau |
| 11,131,397 B2 * | 9/2021 | Yan .......................... B21K 1/20 |
| 2007/0069170 A1 * | 3/2007 | Aoki ..................... F02D 9/1035 |
| | | 251/129.11 |
| 2019/0024820 A1 | 1/2019 | Thurau |
| 2022/0178458 A1 * | 6/2022 | Lindenberg ........... F16K 27/029 |

FOREIGN PATENT DOCUMENTS

| | | |
|---|---|---|
| DE | 202016100236 U1 | 2/2016 |
| JP | 2004309473 A | 11/2004 |

* cited by examiner

VALVE UNIT AND METHOD FOR PRODUCING THE VALVE UNIT

The invention relates to a valve unit and a method of manufacturing the valve unit.

In conventional valve units, in order to hold the valve drive in a defined position, the valve drive is fastened to a holder with the aid of screws, the holder in turn being connected to the fluidics, that is, supported on it. The housing itself therefore does not assume a load-bearing function and is only a protective cap.

Form-fitting connections or substance-to-substance bonds between the housing and the cover in which no pretensioning force can be applied (for example, detent hooks, retaining rings, welded joints, pinned connections, etc.) have the drawback that tolerances between the interior of the housing and the valve drive cannot be compensated. As a result, the motor in the housing of the valve unit, without an indirect attachment in the valve, has to be supported alternately in the cover and then in the housing with each load change due to changing types of load (compression/tension). This makes a precise control very difficult. The tolerances may be manufacturing tolerances, for example, since the housing and the cover are preferably made from plastic material and are produced using an injection molding process, for example. In addition, the valve is intended to be used at operating temperatures of up to 180° C. At these high operating temperatures, the plastic parts are subject to creep, i.e. their dimensions may change. Consequently, the distances between the housing or the cover and the valve drive will also change. On the other hand, fastening the valve drive to the housing using a threaded connection is expensive and time-consuming.

The present invention offers a solution that circumvents the commonly used method of fastening to the holder by means of a threaded connection.

It is therefore the object of the invention to provide a cost-effective valve unit in which tolerances resulting from manufacture and expansions due to high temperatures are compensated.

The object is achieved by the subject-matter of independent claim 1. Further configurations can be found in the dependent claims. The advantages and preferred configurations specified with regard to the valve unit described below are to be applied analogously to the method of manufacturing the valve unit and vice versa.

According to the invention, a valve unit is provided which includes a housing having a cover. Accommodated in the housing is a valve drive which is connected to a valve spindle. A closing body is arranged at an end of the valve spindle opposite to the valve drive.

The valve spindle is designed to be self-locking so that the open and closed states are maintained.

Such a configuration of the valve unit allows the accommodation of a valve drive in a housing to be simplified. Furthermore, the pretensioning of the valve drive by the elastic element compensates for tolerances, for example the manufacturing tolerances of the housing, but also expansion of the materials due to temperature. Since the valve drive drives the valve spindle with the closing body in the axial direction of the valve spindle during operation of the valve unit, the valve drive would move in the housing without a pretensioning by an elastic element. This would decrease the accuracy of the valve unit. Since in the valve unit according to the invention the valve drive is pretensioned against the cover by an elastic element, no movement of the valve drive takes place in the housing during the change between a closing and opening of the valve unit, because the manufacturing tolerances between the interior of the housing and the valve drive are compensated.

Here, the arrangement is selected such that when the valve unit is closed, the resulting force presses the drive more firmly against the cover. As a result, the force acts in the same direction as the elastic element, i.e. the position of the drive remains the same.

For example, the valve drive is an electric drive, in particular an electric stepper motor or an electric linear motor. Depending on the desired application, the preferred motor can be installed here.

In one embodiment, the cover is fastened to the housing by means of one or more detent hooks. The detent hooks are distributed on the cover along the circumferential direction, and the distances between the detent hooks can be regular or irregular. This allows the manufacture of the valve unit to be simplified, since it is not necessary to screw the valve drive to the cover or to the housing. The detent hooks provide for a quick and easy-to-implement connection between the cover and the housing.

Furthermore, the housing has one or more recesses in the circumferential direction, into which the detent hooks can engage. The use of recesses allows the cover and the housing to be manufactured in a simple manner.

Advantageously, the one or more recesses partly or fully penetrate the housing in the radial direction. In particular if the one or more recesses penetrate the housing completely, the valve unit can be opened again in a simple manner by pushing against the detent hooks from the outside and thereby enabling them to be released from the recesses. This allows the valve drive to be easily removed and serviced or repaired.

Moreover, there are also other options for fastening the cover, for example quarter-turn fasteners, frame pegs, crimping, adhesive bonding, etc.

At least one of the housing and the cover is made, e.g., of plastic. The use of plastic is advantageous because it allows weight to be saved and the valve unit can therefore be fastened at the intended location in a simple manner. Furthermore, the manufacture from plastic facilitates the process of manufacturing the housing and/or the cover.

Advantageously, a seal is arranged between the housing and the cover. Such a seal may, for example, be a sealing ring or an O-ring, which is arranged between the housing and the cover along the circumference. Such a seal prevents liquid from being able to enter the housing from the outside and damaging the valve drive.

In an advantageous configuration, the housing has a protrusion provided thereon, in which an electronic component, in particular a printed circuit board, is received. Advantageously, the protrusion is provided on the housing in the area of the valve spindle. The electrical component is seated in the protrusion in such a way that the elastic element prevents the electronic component from moving out of the protrusion in the axial direction of the valve spindle. Such a protrusion allows the electronic component received therein to be installed in a unit with the valve drive. The elastic element therefore has a dual function.

Optionally, the housing has in its interior a shoulder in the region of the valve spindle, the shoulder being opposite the valve drive and the elastic element resting against it. Such a shoulder can be produced, for example, in that the housing has a larger outer circumference in the area of the valve drive than in the area of the valve spindle. For example, the housing may have a cylindrical shape that has a larger diameter in the area of the valve drive than in the area of the valve spindle. As an alternative, the housing may be designed in a cylindrical shape with an axially consistent diameter and have a protrusion inside that forms the shoulder. Also, the shape of the housing does not necessarily have to be a cylindrical shape, but may be any desired shape.

For example, the elastic element is a spring, in particular a spiral spring, a disk spring or a wave spring. A spring is advantageous because it is inexpensive to procure and the pretension required for compensating the manufacturing tolerances can be set to a desired value.

In one embodiment according to the invention, a second elastic element is provided, which supports the motor toward the closing position by pretensioning the valve spindle toward the closing position. The second elastic element here is seated between the valve drive and a further projection arranged on the valve spindle.

The invention further comprises a method of manufacturing a valve unit, in particular a valve unit according to the invention, including the steps of: preassembling a drive assembly having a valve drive; preassembling a housing assembly having a housing with an open side; placing the drive assembly on a cover for closing the housing, wherein an elastic element is placed on the valve drive during preassembling or after placing the drive assembly on the cover; placing the housing with its open side first on the drive assembly while compressing the elastic element; applying a force so that the elastic element is compressed and the valve drive presses against the elastic element; and fastening the housing to the cover.

An alternative to this provides that at first the elastic element is placed in the housing. Subsequently, the valve drive, which is connected to a closing body by means of a valve spindle, is introduced into the housing so that the valve drive rests on the elastic element. Following this, the valve unit is closed with the cover by applying a force, which causes the elastic element to be compressed and the valve drive to press against the elastic element. This method allows a valve unit that compensates for manufacturing tolerances of the housing along with the cover and/or for changes in the size of the housing due to heat to be produced in a simple manner.

Before the housing is placed in position, an electronic component is fastened to the cover, which is located in the housing after the latter has been placed in position.

For example, the application of the force causes one or more detent hooks, which protrude from the cover in the axial direction, to engage in one or more recesses in the housing. The use of detent hooks allows the housing to be closed with the cover in a simple manner and to be opened again for maintenance or repair of the valve drive.

Before the valve unit is closed with a cover, a seal may be inserted between the housing and the cover. Such a seal, for example a sealing ring, prevents the ingress of liquid into the housing and thus protects the valve drive.

Further features and advantages of the invention are included in the drawings below, in which.

Figure 1:
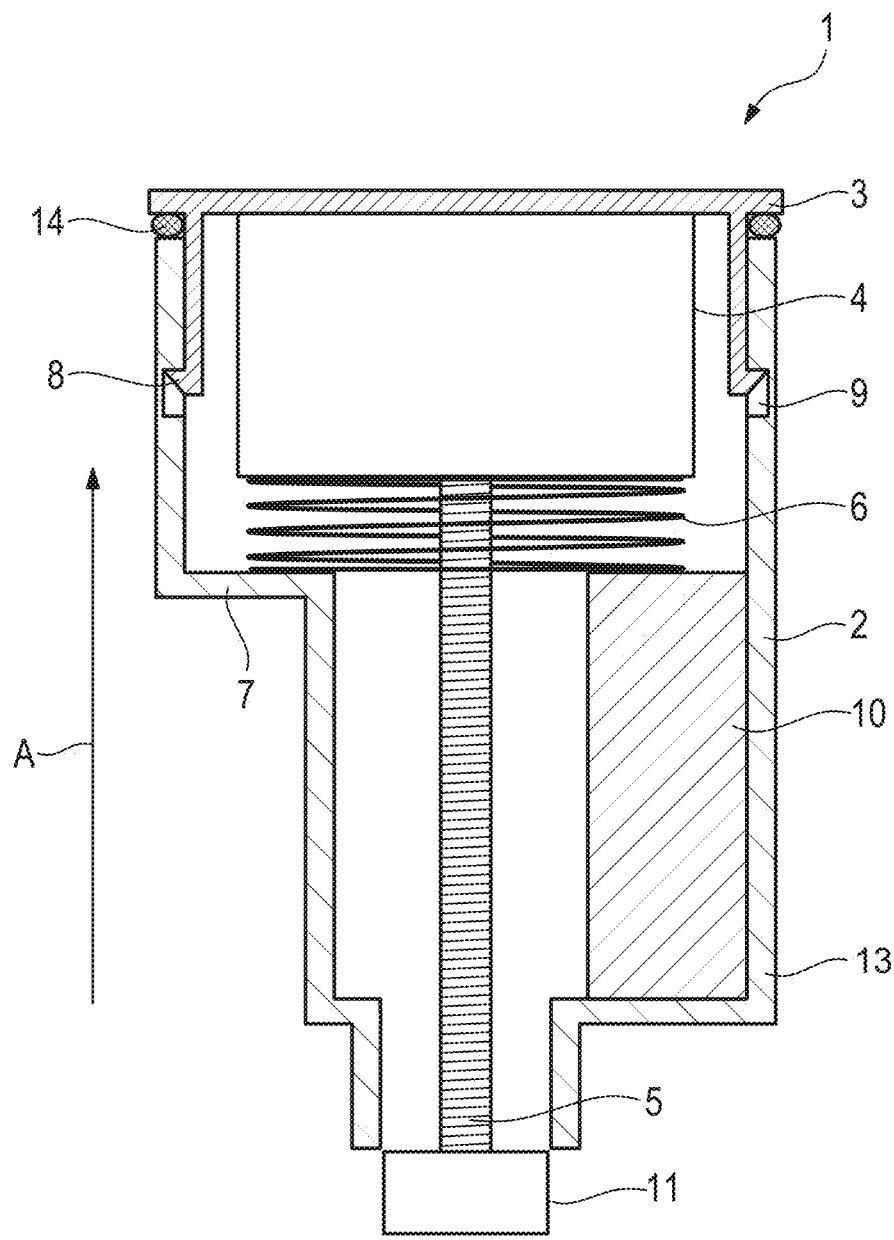
FIG. 1 shows a first embodiment of the valve unit according to the invention.

FIG. 1 shows a valve unit 1 having a housing 2 with a cover 3 in a closed state. Located inside the housing 2 is a valve drive 4, which is connected to a valve spindle 5.

The axial direction of the valve spindle 5 is indicated in the Figures by an arrow marked "A".

A closing body 11 is mounted to the end of the valve spindle 5 opposite to the valve drive 4. This closing body 11 serves to close or to open a conduit in which, for example, a liquid or a gas is transported.

Provided in the interior of the housing 2 is a shoulder 7, which is located spaced apart from the drive 4 in the area of the valve spindle 5.

An elastic element 6 is arranged between a side of the shoulder 7 facing away from the closing body 11 and the valve drive 4. This side facing away constitutes a contact face for the elastic element 6. The elastic element 6 may, for example, be a spring, in particular a spiral spring, disk spring or wave spring. In the area of the valve drive 4, the housing 2 shown in FIG. 1 has a circular cylindrical shape with a diameter that is larger above the shoulder 7 than in the area of the valve spindle 5.

It can further be seen in FIG. 1 that the housing 2 of the valve unit 1 has a protrusion 13 in the area of the self-lockingly mounted valve spindle 5, with an electronic component 10, in particular a printed circuit board, being arranged in the protrusion. Apart from the protrusion 13, the housing has a circular cylindrical shape in this area as well. Here, the electronic component 10 and the protrusion 13 are arranged at the housing 2 such that the elastic element 6 cannot slip out of the protrusion 13 when the electronic component 10 is moved in the axial direction A. In the assembly position, the elastic element 6 is not, however, in direct contact with the electronic component 10, pressing it into the protrusion; rather, there is a small distance between the electronic component 10 and the elastic element 6. Only when the electronic component 10 moves in the axial direction A does the elastic element 6 act as a safety device.

Alternatively, the housing 2 may have some other desired shape. In such a case, the housing 2 may have a projection in the housing 2 in the area of transition from the valve drive 4 to the valve spindle 5, the elastic element 6 resting on the projection.

In a closed state of the valve unit 1, the elastic element 6 pretensions the valve drive 4 toward the cover 3.

One or more detent hooks 8 are provided on the cover 3. In the closed state of the valve unit 1, said detent hook or hooks 8 protrude from the cover 3 in the axial direction A and engage in one or more recesses 9 provided in the housing 2. The one or more recesses 9 may partly or completely penetrate the housing 2 in the radial direction. For example, if the recesses 9 penetrate the housing completely, the detent hooks 8 can be subjected to pressure from the outside and in this way be pushed out of the recesses 9, as a result of which the cover 3 can be separated from the housing 2.

Furthermore, in FIG. 1 a seal 14, for example a sealing ring or an O-ring, is clamped between the cover 3 and the housing 2. By having to apply a force when the cover 3 is inserted into the housing 2 so that the detent hooks 8 engage in the recesses 9, the seal 14 is compressed and seals the interior of the housing 2 against the ingress of liquids, for example.

Figure 2:
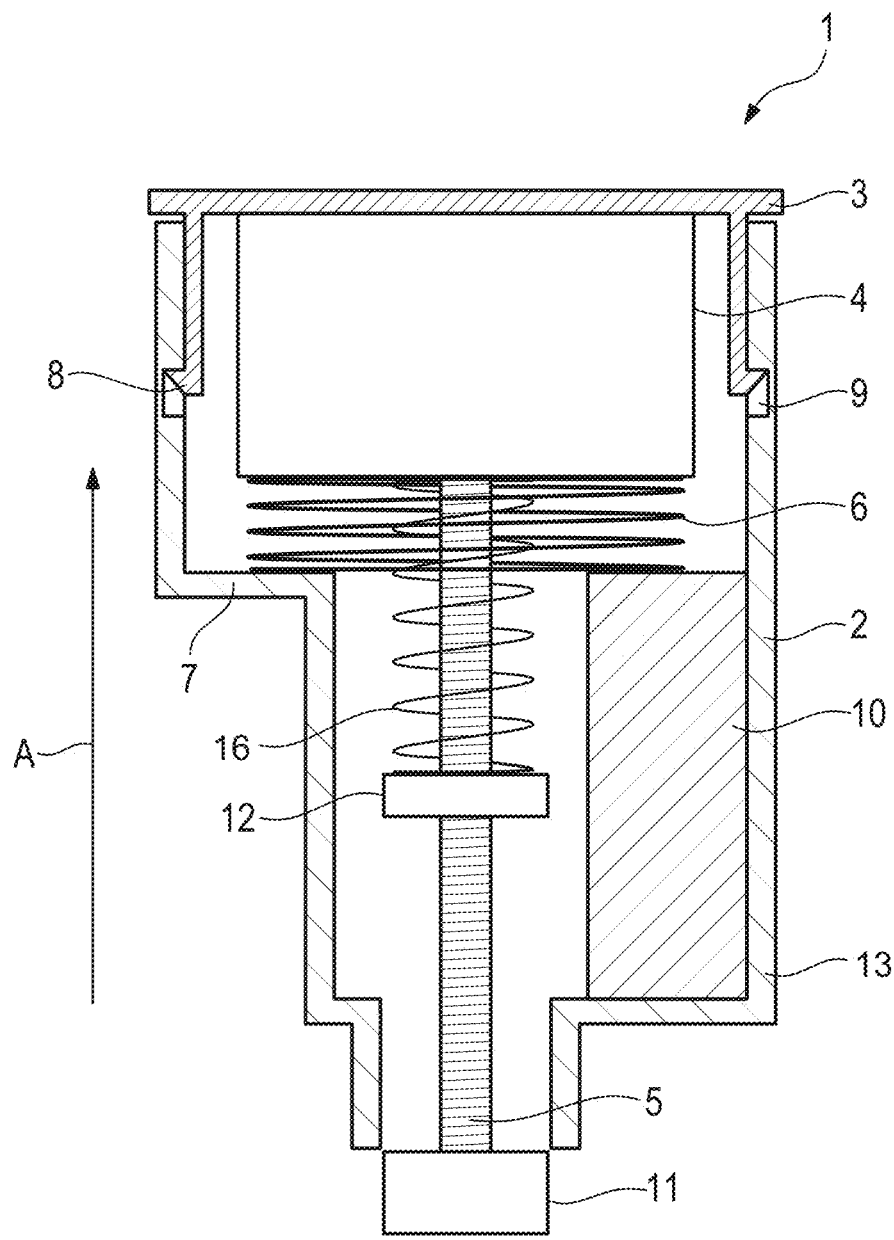
FIG. 2 shows a further embodiment of the valve unit according to the invention, with two elastic elements.

FIG. 2 shows a further embodiment of the valve unit 1 according to the invention. The reference numerals and elements of the valve unit 1 in FIG. 2 are the same as in FIG. 1. Therefore, these will not be described again and reference is made to the description of FIG. 1. The valve unit 1 in FIG.

2 has a projection 12 on the valve spindle 5, on which a second elastic element 16 may rest. The second elastic element 16 moves the valve spindle 5 and the closing body 11 connected to the latter toward a closed position when the drive is in a de-energized state.

Figure 3A:
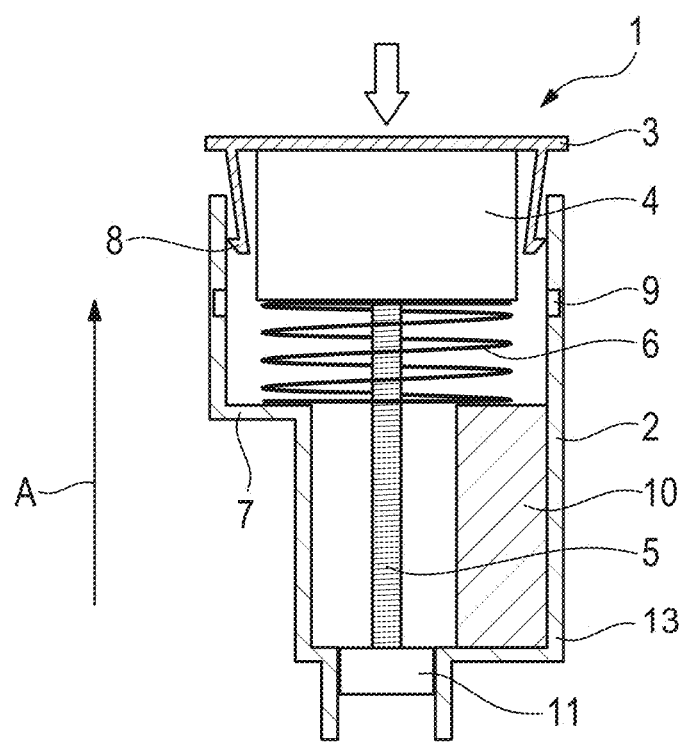
FIG. 3A shows a first step of a method according to the invention of manufacturing a valve unit according to the invention.
Figure 3B:
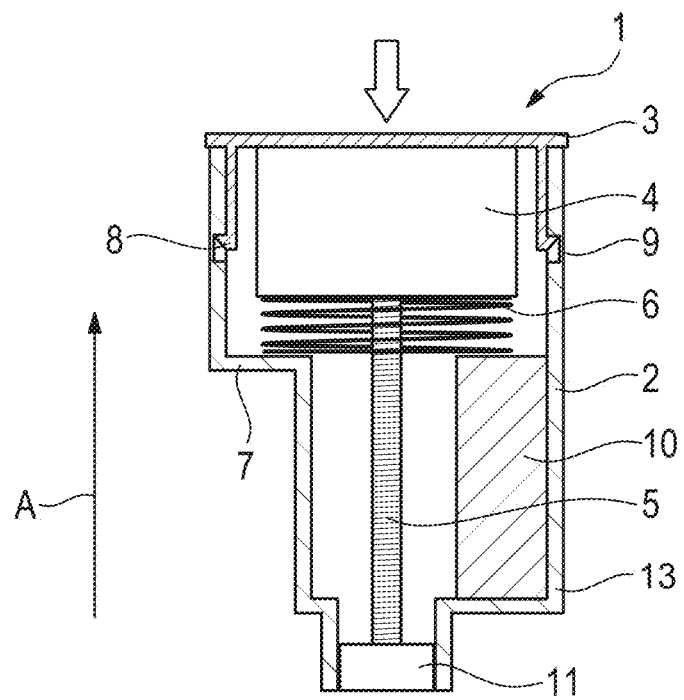
FIG. 3B shows a second step of the method of manufacturing a valve unit according to the invention.

FIGS. 3A and 3B show various steps during the process for manufacturing a valve unit 1, in particular a valve unit 1 as described in connection with FIGS. 1 and 2. FIG. 3A shows a valve unit 1 in the still open state.

The valve unit 1 is assembled upside down. First, a drive assembly including the valve drive 4, the valve spindle 5 and the closing body 11 is preassembled. At the same time, a so-called housing assembly is also preassembled, which includes, inter alia, the housing 2, any seals and the like.

The drive assembly is placed on the cover 3 with the valve drive 4 positioned downwards, the cover 3 being located on a mounting table with the detent hooks 8 protruding upwards. The elastic element 6 has also already been fitted at this point in time. Subsequently, the electronic component 10 is inserted into the cover 3; the cover may have retaining projections here, which allows the electronic component 10 to be positioned.

In the final step, the housing 2 is then placed on with its open side protruding downwards, i.e. is fitted over the parts previously assembled together, with the detent hooks 8 latching into the recesses 9 in the process. Once the detent hooks 8 engage in the recesses 9, the force is no longer applied to the cover 3. As a result, the elastic element 6 presses the valve drive 4 against the cover 3 in the axial direction A of the valve spindle 5.

Even though FIGS. 3A and 3B only show a valve unit 1 according to FIG. 1, the method of manufacturing a valve unit 1 may also be used for a valve unit 1 according to FIG. 2 having a projection 12 and a second elastic element 16.

The invention claimed is:

1. A valve unit comprising a housing having a cover, a valve drive that is connected to a valve spindle, a closing body that is arranged at an end of the valve spindle opposite to the valve drive, and an elastic element that is arranged between a contact face in the housing facing away from the closing body and the valve drive; wherein the elastic element pretensions the valve drive toward the cover in a closed state of the valve unit, wherein the housing has a protrusion provided thereon, in which an electronic component is received, and wherein the protrusion is so arranged on the housing and the electronic component is seated in the protrusion such that the elastic element prevents movement of the electronic component out of the protrusion in an axial direction of the valve spindle.

2. The valve unit according to claim 1, wherein the valve drive is an electric drive.

3. The valve unit according to claim 1, wherein the cover is fastened to the housing by means of one or more detent hooks.

4. The valve unit according to claim 3, wherein the housing has one or more recesses in a circumferential direction, in which the detent hooks can engage.

5. The valve unit according to claim 4, wherein the one or more recesses partly or fully penetrate the housing in a radial direction.

6. The valve unit according to claim 1, wherein at least one of the housing and the cover is made of plastic.

7. The valve unit according to claim 1, wherein a seal is arranged between the housing and the cover.

8. The valve unit according to claim 1, wherein the protrusion is provided on the housing in a region of the valve spindle.

9. The valve unit according to claim 1, wherein the housing has in its interior a shoulder in a region of the valve spindle, the shoulder being opposite the valve drive and the elastic element resting against it.

10. The valve unit according to claim 1, wherein the elastic element is a spring, a disk spring or a wave spring.

11. The valve unit according to claim 1, wherein a second elastic element is provided, which pretensions the valve spindle toward a closing position when the valve drive is de-energized.

* * * * *